United States Patent [19]

Goser

[11] 3,767,945

[45] Oct. 23, 1973

[54] CIRCUIT AND CONSTRUCTION OF SEMICONDUCTOR STORAGE ELEMENTS

[75] Inventor: Karl Goser, Munich, Germany

[73] Assignee: Siemens Aktiengesellschaft, Berlin & Munich, Germany

[22] Filed: Feb. 2, 1972

[21] Appl. No.: 223,084

[30] Foreign Application Priority Data

Feb. 5, 1971 Germany .................. P 21 05 479.5

[52] U.S. Cl. ................................ 307/279, 307/303

[51] Int. Cl. .......................................... H03k 3/286

[58] Field of Search ............................ 307/279, 303

[56] References Cited

UNITED STATES PATENTS

| | | | |
|---|---|---|---|
| 3,518,635 | 6/1970 | Cole et al. | 307/279 X |
| 3,588,844 | 6/1971 | Christensen | 307/279 X |
| 3,612,900 | 10/1971 | Davies | 307/279 X |
| 3,624,419 | 11/1971 | Kosonocky | 307/279 |
| 3,683,206 | 8/1972 | Haraszti | 307/279 |

*Primary Examiner*—John S. Heyman
*Attorney*—Carlton Hill et al.

[57] ABSTRACT

A flip flop circuit and structure with integrated semiconductor storage element for dynamic technique with two field-effect transistors of the flip flop.

5 Claims, 3 Drawing Figures

CIRCUIT AND CONSTRUCTION OF SEMICONDUCTOR STORAGE ELEMENTS

BACKGROUND OF THE INVENTION

The use of semiconductor devices to form a storage element in which a bistable multivibrator circuit is employed is well known. These storage devices may be conveniently formed as an integrated circuit in a semiconductor member. It is also known to provide an intermittent pulse-type supply voltage instead of a continuous supply voltage. Prior art circuits for storage elements of this type have employed a switching transistor in each individual branch of the flip flop and generally have also provided a transistor as a ballast resistance. These ballast resistant elements have also been in the form of field-effect transistors.

SUMMARY OF THE INVENTION

The present invention is directed to the problem of providing a circuit structure for a storage element of a semiconductor memory in which there is a substantial decrease in dissipation loss. The nature of the structure of the present invention has the effect of providing a storage element which requires very much less space than that previously required. In each of the two branches of the flip flop, a capacity is provided and in each of the two feedback crossings, a transfer transistor is provided as a switching element. Construction of the corresponding storage element is characterized by the fact that the circuit elements are realized in a semiconductor member or in a semiconductor layer formed on a substrate in a single channel technique. Thereby, the capacities provided as ballast elements are preferably insulated layer capacities with a metal electrode and with an n- or p-type conducting area, or with an inversion layer in the semiconductor layer as a counter-electrode. Preferably, field-effect transistors are used as the transfer resistors.

IN THE DRAWINGS

DESCRIPTION OF A PREFERRED EMBODIMENT

Figure 1:
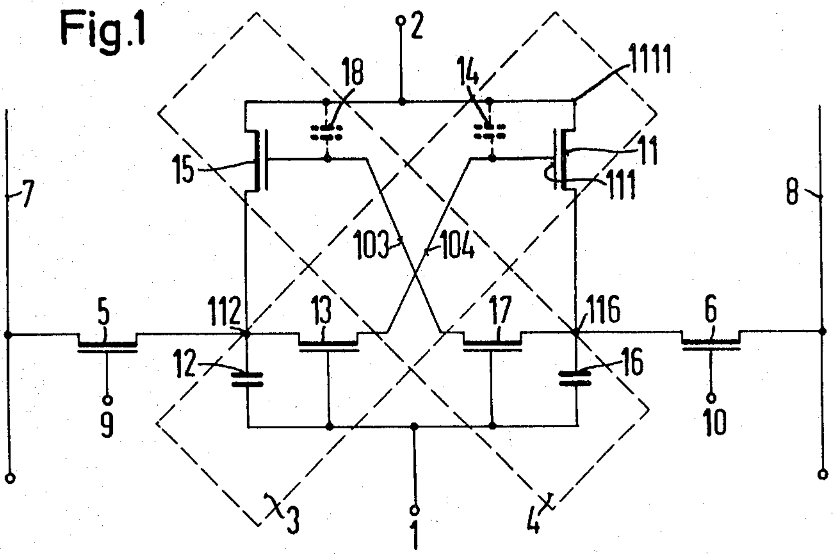
FIG. 1 is a diagrammatic view of a storage element embodying the teachings of the present invention.

Referring now to these drawings, there is shown a flip flop consisting of two branches, which are indicated by the two dotted line boxes 3 and 4. The crossings or feedback circuits are designated as 103 and 104. The branch of the circuit of the storage element contained within the dotted line box 3 has a field-effect switching transistor 11, a capacity 14, a transfer field-effect transistor 13, a capacitor 12 and a conductor path 104. The capacity 14, as will hereinafter be apparent, is of great importance for the proper operation of the circuit as a storage element.

As pointed out above, the switching elements of one branch, namely, the branch contained in box 3, are designated as 11–14. The other branch of the flip flop, as indicated by box 4, has a set of corresponding switching elements designated as 15–18. An impulse type voltage wave is supplied to the storage element through terminals 1 and 2. A pair of field-effect transistors 5 and 6 are connected between points 112 and 116 and digit lines 7 and 8, respectively. Transistors 5 and 6 are provided with gate terminals 9 and 10 which are connected by suitable address lines in the storage matrix (not shown).

The storage element, illustrated in FIG. 1, is a preferred embodiment of the present invention and functions in the following manner. Let it be assumed that the condition of the storage element is such that the switching transistor 11 is conductive and the switching transistor 15 is blocked. This condition can be achieved via the selective transistors 5 and 6 by corresponding voltages at the digit lines 7 and 8 passing through the memory of the connections 9 and 10. Transistors 5 and 6 are blocked as long as nothing is written or read, but are conductive during reading and writing in order to read out or put in potentials at junction points 112 and 116. In the illustrated embodiment of the present invention, an impulse-shaped voltage $U(t)$ is applied to terminals 1 and 2. In the case of a p-type channel transistor, a negative potential with respect to terminal 2 is applied to terminal 1. Since it has been assumed that the transistor 11 is conductive, an electrical voltage $U_{G11}$ is applied to gate 111 and the source electrode 1111 of the transistor. Also, between 111 and 1111 lies the circuit capacity 14 shown by dotted lines in the figure, which is thereby charged with the gate voltage. In the periods during which no electrical voltage is applied across 1 and 2, i.e., during each period between two consecutive impulses of the supply voltage U, the voltage diminishes according to the capacity value 12 and the still remaining parasitic electrical impedances lying parallel to the circuit. Between potential changes, corresponding to the impulses at 1 and 2, the diminishing gate voltage $U_{G11}$ is again continuously increased to its maximum value to maintain the stored condition, this being done by means of a charge flow via capacity 12 and the transfer transistor which opens at times. During the increase of impulse voltage U, the voltage $U_1$ increases in proportion with U between circuit points 2 and 112, whereby the proportionality factor equals the capacity relation $C_1/(C_1+C_{10})$. $C_1$ corresponds to the capacity value of capacity 12 and $C_{10}$ corresponds to the capacity value between point 2 and point 112, which occurs in the circuit. As soon as the gate voltage of the transistor 13 is large enough, 13 becomes conductive and capacity 14 is recharged. When the impulse voltage U diminishes, the transistor 13 will be blocked again, so that the capacity 14 can only be discharged via the parallel residual resistances. When the voltage U diminishes, voltage $U_1$ changes its sign due to the differentiating effect of capacity 12, but its further increase is limited by the effect of the diode path becoming conductive between 2 and 112. If an impulse of the supply voltage $U_2$ is switched in, the voltage between the circuit points 2 and 116, i.e., transistor 11, only increases slightly because this transistor has remained conductive. This causes the gate voltage $U_{G15}$ at the transistor 15 to always remain so low that this transistor remains blocked.

Figure 2:
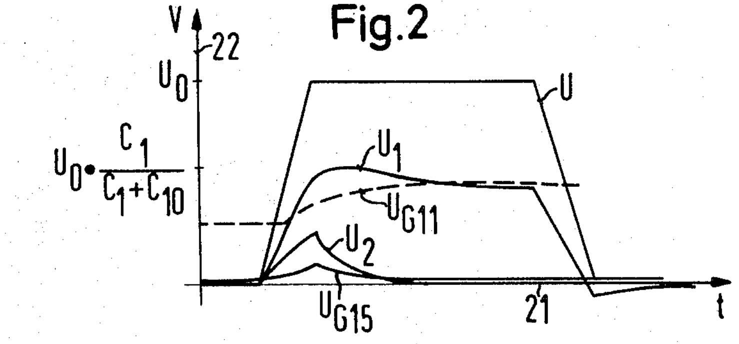
FIG. 2 is a voltage diagram as a function of time showing certain individual voltages of the circuit of FIG. 1, in the cycle of operation.

FIG. 2 shows the chronological course of the individual voltages. The time ($t$) has been entered on the abcissa 21. The ordinate 22 represents the relative values of the individual electrical voltages occurring in the circuit. The signs given for the individual curved paths correspond to the ones given by way of example above.

Figure 3:
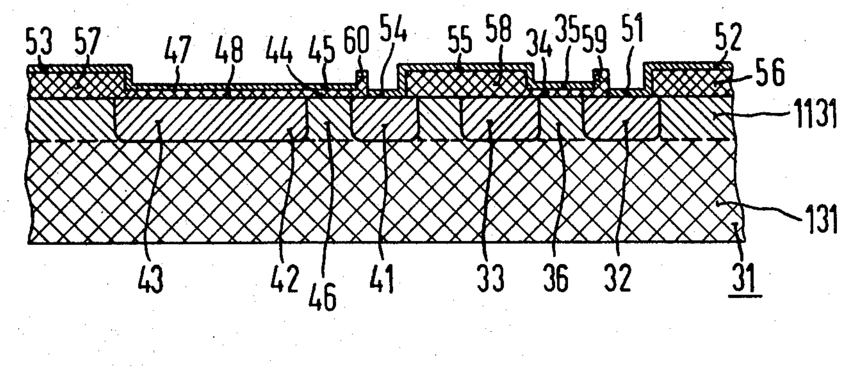
FIG. 3 is a framentary cross-sectional view of an integrated circuit member which provides the circuit of FIG. 1.

Preferably, insulating layer-field-effect transistors are used as circuit transistors and/or transfer transistors for the circuit of this invention. FIG. 3 illustrates in cross section a preferred embodiment of a storage element formed in accordance with the present invention and particularly illustrates a branch, such as branch 3 or 4 of FIG. 1. The storage element shown includes a substrate 31, the portion of one particular branch being designated as substrate 131. This substrate 131 is preferably electrically nonconductive or is of n-type conductivity and has a semiconductor layer 1131 formed thereon. For the example shown, the semiconductor substrate 131 and the semi-conductor layer 1131 are of n-type conductivity. Individual areas 32, 33, 41 and 43 are formed in layer 1131, having a p-type conductivity. These areas, 32, 33, 41 and 43, may be produced by known technical procedures, such as, for example, by diffusion or ionic implantation. As will now be pointed out, several insulating layer regions as well as metal layer regions are applied on the surface of the block 31.

The circuit transistor is formed by the areas 32 and 33, which will constitute the source and the drain of the transistor. The circuit transistor as shown in FIG. 3 also includes an insulating layer 34 and a metal coating 35 in order to create an insulating gate field-effect transistor. The insulating layer 34 extends, as is known in field-effect transistors, partly past the areas 32 and 33 as well as past the area 36 lying between 32 and 33 of the semiconductor substrate 31, or the layer 1131. Below the insulating layer 34, the channel, which is characteristic of a field-effect transistor, is formed in area 36 when a corresponding potential is applied at the coating 35, which is operated as a gate.

The transfer transistor is formed by area 31 and the adjacent part 42 or the entire area portion 43, as well as by the insulating layer 44 and the metal coating 45. The channel, characteristic for field-effect transistors between the areas 41 and 42, is formed below the insulating layer 44 in the semiconductor area 46 of layer 1131. The capacity which, according to the present invention, is designed to be a ballast element, is formed by the metal electrode 47, which is an area coating and the doped area 43 acting as a counter-electrode. The insulating layer lying between 47 and 43 acts as a dielectric. It is preferable to have the insulating layers 44 and 48 as well as the coatings 45 and 47 designed in one piece.

Additional metal coatings are provided as terminals or galvanic connections between the individual switching elements of a branch. 51 is the galvanic connection for the source area 32 of the switching transistor, while 52 is the terminal which corresponds to the circuit point 2 of FIG. 1. The terminal corresponding to the circuit point 1 of FIG. 1 is designated in FIG. 3 as 53. The terminal to the drain area of the transfer transistor is designated as 54. The galvanic connection shown in FIG. 1 as crossing 3 or 4 between the circuit transistor and the transfer transistor, is designated as 55.

For the electrical insulation of coatings 52, 53 and 55 with respect to the semiconductor member 31 or the semiconductor layer 1131, the layers 56, 57 and 58 are provided and are formed as a so-called thick oxide of grown insulating material. The parts 59 and 60 of the insulating layers serve as an electrical insulation between the respectively adjacent electrodes.

In the example shown in FIG. 3, the capacity 12 or 16 is an insulating layer capacity. To create the counter-electrode, which in this case is realized as a p-type conductive area, an inversion layer may be used which forms by voltage applied to 47, during operation, at the surface of the semiconductor member or semiconductor layer. In order to keep the parasitic inversion currents between the drain area 41 of the transfer transistor and the semi-conductor member 31, preferably lying at the potential of 52 or the circuit point 2, as low as possible, the area 41 should be kept geometrically as small as possible. Where a p-type conductivity substrate or a p-type conductivity layer 1131 is employed, n-type conductivity areas 32, 33, 41 and 43 are provided.

For a storage element according to the present invention, two integrated components each, as shown in FIG. 3, are arranged in one and the same semiconductor member or in one layer made of semiconductor material on a substrate member and are connected galvanically, preferably by an integrated technique, in such a way as to provide the circuit shown in FIG. 1.

A multitude of such storage elements may be interconnected in an integrated monolithic way for one whole semiconductor memory. An example of a storage element according to the present invention will now be described. If the surface area of capacity 12 or 16 is $33 \times 33$ $\mu m^2$ and the surface of the drain area 41 of the transfer transistors 13 or 17 amounts to $10 \times 10$ $\mu m^2$, experimental investigations and a computer-supported analysis of the circuit reveals that the dissipation loss of a storage element amounts to 0.07 $\mu$W. This value is approximately 10 times smaller than the value which can be achieved with prior art storage elements.

The storage element, according to the present invention, had a number of advantages. Its dissipation loss is very small, since in the state of rest only the unavoidable inverse currents flow through the pn transits between the doped areas and the substrate, which is galvanically connected with 52. The occupied space of a storage element, according to the invention, is smaller than that of an element in complementary-channel technique in massive silicon, or of an element in single channel technique with ballast transistors having a correspondingly large channel length. Decisive for the maintenance of the condition of the storage element is the number of voltage changes per unit of time. Due to the differentiating effect of capacitors 12 and 16, the sequence of the impulses is important. Thereby an independent adaptation of the power consumption to the inverse currents and thereby a more simple supply of the semiconductor memory with the required operational impulse voltages to 1 and 2 can be achieved. The utilization of the gate capacity of a field-effect transistor for information storage, according to the present invention, is especially advantageous because the charging of such capacity diminishes slower than that of a blocked layer capacity. Thereby the time difference between the individual impulses of the supply voltage can be rendered comparatively large.

In case of a semiconductor layer 1131 on a nonconductive substrate 131, it is of advantage to subdivide this layer into individual islands, i.e., into islands which always contain only one switching transistor or one transfer transistor with the respective capacity provided as ballast resistance. Thus the inverse currents flowing via the substrate between the ballast transistor and the transfer transistor of a branch of a storage element and proceding to other storage elements can be eliminated.

I claim as my invention:

1. A bistable multivibrator switching circuit for a storage element comprising a pair of switching transistors interconnected in a flip-flop array with crossover paths, a transfer transistor in each crossover path having their gate electrodes directly connected with each other, and a load capacitor in each cross-over path, said circuit being arranged to be connected to a source of pulse voltage.

2. A bistable multivibrator switching circuit according to claim 1 in which said switching transistors are insulated gate field-effect transistors.

3. A bistable multivibrator switching circuit according to claim 1 in which said transfer transistors are insulated gate field-effect transistors.

4. A flip-flop storage element comprising a pair of insulated gate field-effect transistors for switching, a ballast capacitor connected in series with the channel of each of said switching transistors respectively, a source of voltage pulses connected across each of said series connected capacitor-transistor channels, an electric path between the gate of each of said switching transistors and a point between the channel of the other of switching transistors and its series connected capacitor, an transfer field-effect transistor in each of said electric paths, the gates of said transfer transistors being directly connected to each other and to one side of said pulse source, and a capacitor connected between each of said electric paths and the other side of said source.

5. A flip-flop storage element according to claim 4 in which a pair of access insulated gate field-effect transistors have their respective channels connected between digit lines respectively and said points respectively, and in which the gates of said access transistors are connected to access lines of a storage memory.

* * * * *